United States Patent Office 3,271,868
Patented Sept. 13, 1966

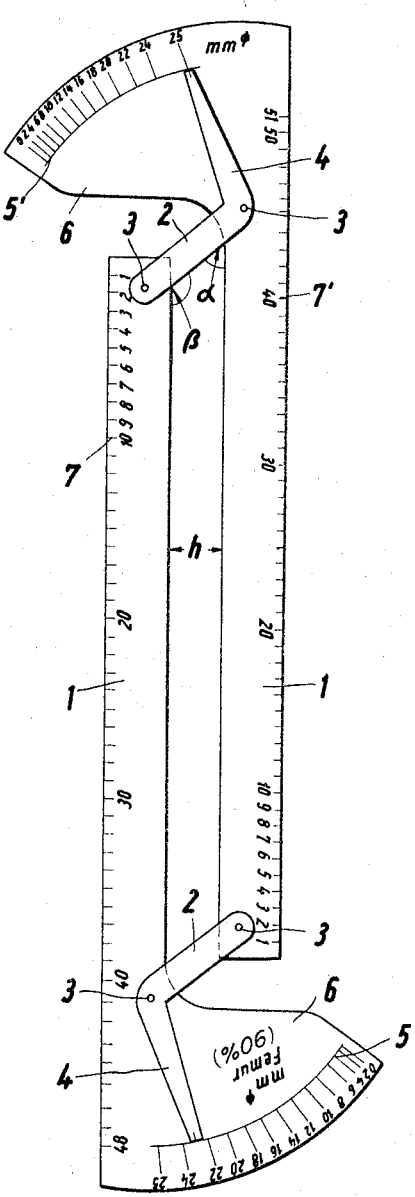

3,271,868
DEVICE FOR MEASURING TWO-DIMENSIONAL REPRESENTATIONS
Gerhard Küntscher, Hamburg-Blankenese, and Benno Lotz, Kiel, Germany, assignors to Ortopedia Gesellschaft mit beschrankter Haftung, Kiel-Dietrichsdorf, Germany
Filed Mar. 3, 1964, Ser. No. 349,068
Claims priority, application Germany, Aug. 7, 1963, O 9,602
3 Claims. (33—143)

The invention relates to a device for measuring X-ray photographs, drawings or other two-dimensional representations, and is of particular usefulness in osseous surgery for determining the spike or nail size for bone marrow spiking.

Heretofore, it has been common practice in surgery to determine the dimension of the bone by means of a caliper scale and a steel ruler as commonly used in metal industries, i.e. the diameter of the bone or of the marrow-cavity of the bone has been determined with the caliper scale, while the length of the bone or of a portion thereof has been measured with the ruler. Difficulty encountered in measuring the diameter by use of the caliper scale results from the fact that the cross-section of the bone in no way is the same at all locations along the bone, but rather includes restrictions and enlargements which, besides, may extend unsymmetrically relative to the bone axis. In measuring the bone, e.g. for the purpose of marrow spiking, the surgeon therefore theoretically was compelled to imagine a cylinder extending all over the total length of the bone as deduced from a plurality of substantially point-like individual measurements by the caliper scale, which cylinder corresponds to the required tubular spike; this, however, was only possible for very experienced surgeons so that many marrow spiking operations failed because of the wrong plotting of the X-ray photograph.

This condition was aggravated by the fact that due to the central proejction the X-ray photographs of a femur are enlarged by 10% in comparison with the natural condition.

Thus, this value of 10% heretofore had to be subtracted mathematically from the diameter and length dimensions as obtained with caliper scale and ruler. Besides, the X-ray photographs frequently suffered more or less damage from the sharp edges of the caliper scales and rulers consisting of steel.

In order to eliminate the abovementioned disadvantages of the previously practiced measuring method, the invention provides a completely novel device which in a simple manner allows measuring both the diameter and the length dimensions in plotting X-ray photographs, whereby no complicated calculations are necessary and damages of the X-ray phtograph are avoided.

According to the invention, this device for measuring two-dimensional objects consists of four elongated components combined to form a parallelogram being shiftable in its own plane; at least two of these components which form non-opposed legs of the parallelogram each being provided at their respective adjacent ends with an extension whereby one of these extensions represents a pointer and the other one carries a scale upon which the pointer slides on shifting of the parallelogram.

The invention will now be further described with reference to the accompanying drawing showing schematically a section through a femur with the measuring instrument of the invention applied thereto.

In general, the device of the invention for measuring two-dimensional representations consists of a parallelogram comprising two pairs of legs 1 and 2 which are pivotally connected to each other at their points of overlap so that the interior angles α, β of the parallelogram, and thus also the height thereof, may be varied by shifting the legs within the plane of the parallelogram. In a preferred embodiment of the invention, the individual legs comprise ruler-like bars whereby the short legs 2 rest upon the longer legs 1 and are riveted thereto at the corners 3 of the parallelogram. The exact construction of the components of the parallelogram as well as the manner of interconnecting its legs is of minor importance only, as long as the interior angles between the legs may be varied by shifting the two legs of a pair of legs parallel to each other, and as long as the device is provided with an indicator for easily reading the height of the parallelogram.

For thus purpose, the legs of the one pair of legs, e.g. the short legs 2, each are provided with a projection 4 formed as a pointer, which projection, during shifting of the parallelogram, moves along an extension 6 of the one leg of the other pair of legs, i.e., in the present case, an extension of one of the longer legs 1, which extension is provided with a scale 5 thereon.

In general, only one leg of the one pair needs to be provided with a pointer projection 4, and only one leg of the other pair of legs needs to be provided with an extension 6, the scale 5' of which directly indicates the height of the parallelogram on an enlarged scale and for example in units of millimeters. However, in a preferred embodiment of the invention, both legs of each pair of legs are provided at their diametrically opposed ends with corresponding projections and extensions, respectively, which pairs of co-operating projections and extensions differ from each other merely in that one scale 5' is provided with a scale factor which is shortened by 10% with respect to that of the other scale 5, so that the true dimensions of the bone may be read directly from said scale 5, and the previously necessary conversion becomes superfluous. In the illustrated embodiment of the invention, this scale has been designated "Femur."

For determining the outer diameter of the bone or the diameter of the marrow-cavity, the measuring instrument of the invention is placed on the respective X-ray photograph longitudinally of the bone in such manner that the diametric dimension is located between the inner edges of the two longer legs. The minimum, the medium, or the maximum diameter can easily be determined by shifting the legs relative to each other. In the case of marrow spiking, the distance between the two inner edges of the longer legs corresponds to the diameter of the marrow spike, and the user of the instrument without more ado is able to imagine in which way the spike will extend along its entire length through the marrow-cavity. If the ruler is made of transparent material, such as polystyrene, it can easily be seen where there are restrictions in the marrow-cavity which must be enlarged by drilling, or where the marrow-cavity is of such large diameter that the marrow spike will not contact the inner wall of the bone.

For determining the length dimensions of the bone or of the marrow spike required, the outer and/or the inner edges of the longer legs 1 additionally may be provided in the manner of a ruler with graduations 7 calibrated e.g. in units of centimeters, so that one and the same instrument allows both diameter and length measurements. In this case, it is also advisable to provide one scale 7' with a calibration being shortened by 10% with respect to the scale 7 actually calibrated in units of centimeters. In the embodiment of the invention shown in the drawing, the longer legs 2 carry a scale 7 and 7', respectively, at their outer edges only.

Although the device of the invention has been designed specifically for measuring X-ray photographs used in osseous surgery, this instrument obviously can be used in all cases where the length and width dimensions of elongated two-dimensional drawings, pictures or similar two-dimensional representations are to be determined rapidly and exactly whereby, if necessary, a simultaneous conversion of the measuring results can be performed without additional adjustments of the instrument. Such problems are encountered in many fields of technics, for example in plotting or reading constructional drawings. If desired, one of the scales may be calibrated in degrees in order to allow direct reading of one of the interior angles $\alpha$ or $\beta$ of the parallelogram.

What we claim is:

1. A measuring instrument for application to an X-ray photograph of an anatomical bone, and for directly indicating both the true dimensions of the X-ray photographic image, and the corrected dimensions of said bone, allowing for the enlargement factor due to the central projection distortion resulting from the X-ray technique, said instrument comprising:

(a) a pair of elongated, flat ruler-like legs carrying respective lengthwise scales of true photographic length and of corrected actual length, and each leg having at one end thereof an integral, arcuate enlarged scale-bearing extension which is coplanar with and extends lengthwise beyond the body of said leg;

(b) a pair of shorter flat links respectively pivotally connected at one end of each said link to a point near one end of each of said respective legs which is at the arc center of its said extension, said links being respectively pivotally connected at the other end of each such link to a point near the opposite end of each respective leg, to form with said legs a shiftable parallelogram;

(c) each of said links having an integral pointer element adapted to move along a respective arcuate scale marked on the corresponding one of said extensions, as said parallelogram is shifted, the relation of the pointer element length to the scale factor of each arcuate scale being such as to provide, at the respective arcuate scales, simultaneous indications both of true photographic width and of corrected actual width of the bone as measured on said photograph between the facing edges of said legs, when said device is applied to the photograph with the facing edges of said legs overlying the longitudinal margins of the image of the bone.

2. A measuring instrument in accordance with claim 1, in which said legs and their integral arcuate extensions are formed of a transparent material.

3. A measuring instrument in accordance with claim 1, in which said legs are physical duplicates of one another as to dimensions and profile shape.

References Cited by the Examiner

UNITED STATES PATENTS

| | | | |
|---|---|---|---|
| 48,454 | 6/1865 | Simpson | 33—108 X |
| 66,120 | 6/1867 | Bigelow | 33—111 |
| 523,259 | 7/1894 | Beeler | 33—108 |
| 1,105,217 | 7/1914 | Stegmaier | 33—143 |
| 1,746,537 | 2/1930 | Knechtel | 33—108 |
| 2,104,301 | 1/1938 | Haughey | 33—108 |
| 2,819,526 | 1/1958 | Brown | 33—1 |

FOREIGN PATENTS

| | | |
|---|---|---|
| 1,021,087 | 11/1952 | France. |
| 8,750 | 4/1913 | Great Britain. |

OTHER REFERENCES

"Miscellaneous Radiographic Supplies," Ball Calculator General Electric X-Ray Corporation, pub. 7E–466 pages 2 and 3, Chicago, Ill.

LEONARD FORMAN, *Primary Examiner.*

ISAAC LISANN, *Examiner.*

WILLIAM D. MARTIN, JR., *Assistant Examiner.*